Jan. 2, 1951   F. V. COLLINS   2,536,911
TUBE FORMING APPARATUS
Filed Dec. 19, 1946
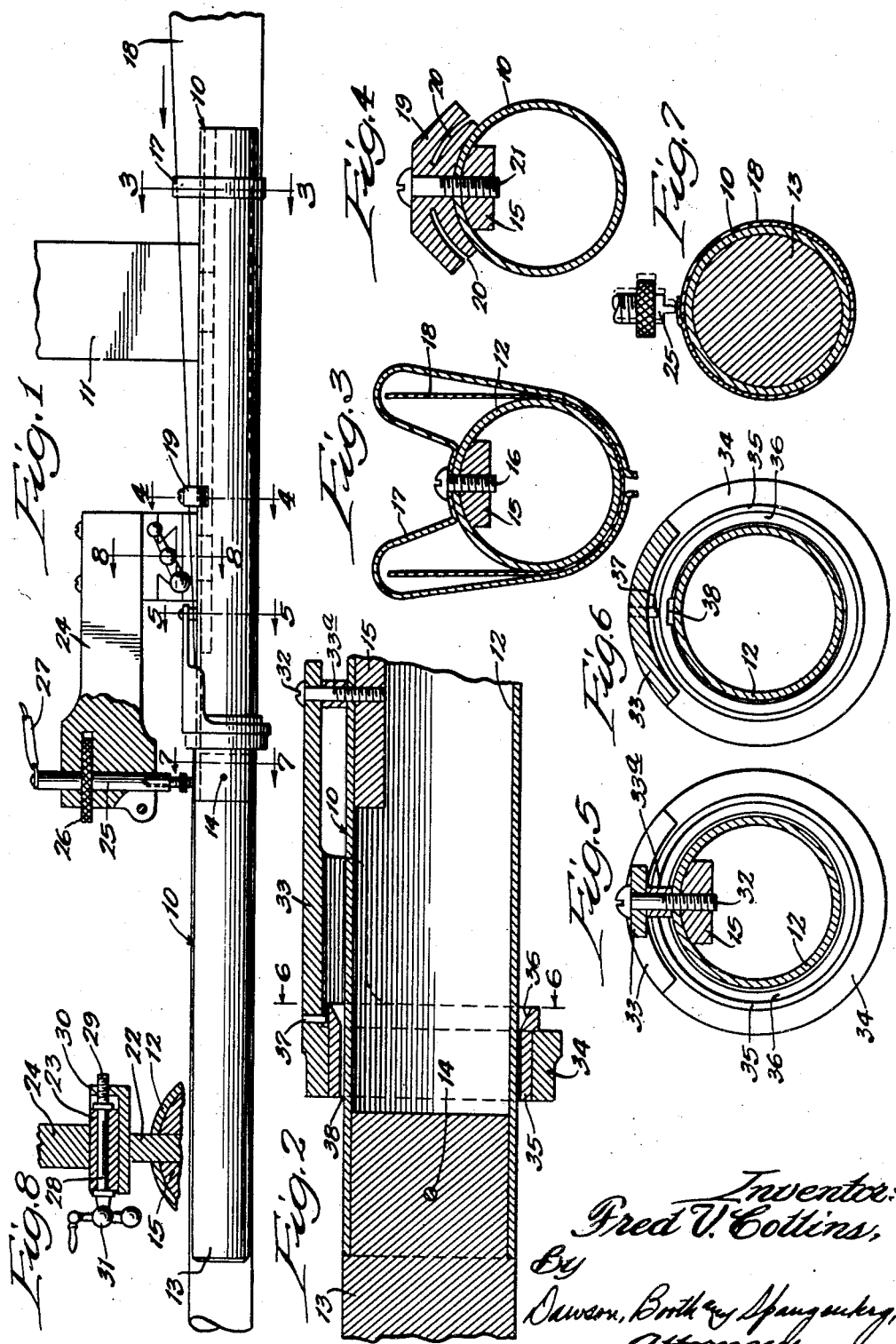
Inventor:
Fred V. Collins,
By
Dawson, Brith and Spangenberg,
Attorneys.

Patented Jan. 2, 1951

2,536,911

UNITED STATES PATENT OFFICE 2,536,911

TUBE FORMING APPARATUS

Fred V. Collins, Des Plaines, Ill., assignor to William F. Stahl, Kenilworth, Ill.

Application December 19, 1946, Serial No. 717,198

2 Claims. (Cl. 154—42)

This invention relates to tube-forming apparatus and is particularly useful in the forming of tubes from flat fusible stock.

It is common practice to form tubes from plastic materials such as cellulose acetate, vinyl acetate, and from a variety of other materials and to ship the tubes thus formed with suitable reinforcing or protecting members to the point where they are to be used. The product is bulky, fragile, and the expense of shipment is high. At the destination, considerable space is required for storing.

An object of the present invention is to provide improved means for the forming of tubes from flat stock and more particularly through the fusing of the edge portions of the plastic strip. Yet another object is to provide improved means for supporting the apparatus upon a mandrel about which a sheet of plastic material is to be formed into a tube, the apparatus providing improved means for folding the sheet and for supporting electrical means for fusing the edges thereof. A still further object is to provide apparatus whereby fusion of overlapping edge portions of a continuous sheet can be brought about through the use of high frequency radio waves or by other means so as to provide a continuous tube while at the same time affording means for supporting the necessary folding and treating apparatus upon the mandrel about which the tube is formed. Other specific objects and advantages will appear as the specification proceeds.

The invention is illustrated, in a preferred embodiment, by the accompanying drawing, in which—

Fig. 1 is a broken side view in elevation of apparatus embodying my invention; Fig. 2, a broken, enlarged sectional view of a portion of the mandrel and the tube-forming ring supported thereon; Fig. 3, an enlarged, transverse sectional view, the section being taken as indicated at line 3 of Fig. 1; Fig. 4, an enlarged, transverse sectional view, the section being taken as indicated at line 4 of Fig. 1; Fig. 5, an enlarged transverse sectional view, the section being taken as indicated at line 5 of Fig. 1; Fig. 6, a transverse sectional view, the section being taken as indicated at line 6 of Fig. 2; Fig. 7, an enlarged transverse sectional view, the section being taken as indicated at line 7 of Fig. 1; and Fig. 8, a sectional detail view, the section being taken as indicated at line 8 of Fig. 1.

The present application constitutes an improvement upon my co-pending application of my Serial No. 651,642 for Tube Forming Apparatus and Method, now Patent No. 2,504,500. In the above application, there is set out in detail an apparatus in which a mandrel is supported for receiving a flat web of plastic material. The web of plastic material is carried upon a spindle and fed along the mandrel, means being provided for rolling the web to form a tube, and an electronic foot is supported for fusing the overlapping edges of the plastic material. The tube is drawn along the mandrel by means of two resilient rollers which engage the completed tube and draw it along the mandrel. I have discovered that the operation of the structure can be vastly improved by supporting the electronic foot in the manner described herein and by providing folding mechanism supported upon the mandrel and for use in conjunction with the electronic foot.

In the illustration given herein, 10 designates a mandrel which is provided near its rear with an upwardly extending support member 11. The support member 11 is carried by any suitable frame structure. The mandrel 10 is illustrated as a two-part structure, the first part being in the nature of a tube 12, and the forward part being in the nature of a solid rod 13. As shown more clearly in Fig. 2, the solid portion 13 is reduced at its rear so as to be received within the tube 12 and the parts are secured together by a pin 14. It will be understood that the mandrel may be formed in any desired manner.

The tube portion 12 of the mandrel 10 is equipped on its inner side, and under the top, with a longitudinally extending metal strip 15.

Extending through the rod 15 of the tube 12, at the rear of the mandrel 10, is a screw 16 which clamps in position a guide member 17. The shape of the guide member 17 is shown more clearly in Fig. 3, and the function of the guide member is to receive the plastic tape 18 and to fold it partially to the position illustrated best in Fig. 1.

Beyond the guide 17 is a slot plate 19, as shown more clearly in Fig. 4. The plate 19 is provided with arcuate slots 20 in which the edges of the web 18 are treated, and the plate is held in position by means of the screw 21.

Forwardly of the member 19, as illustrated in Fig. 1, is a support for the electronic foot. The support comprises a fixed member 22 which is held within the plate 15 and which slidably receives a movable block 23 carrying the horizontal carriage 24. The carriage 24 is recessed vertically at its forward end to receive the electronic foot 25. A nut 26 is received within a horizontal recess at the forward end of the carriage 24 and engages a threaded portion of the electronic foot so as to raise or lower the same upon rotation of the nut 26. Suitable connections 27 are provided for conveying the current to the electronic foot and for producing the desired high frequency radio waves. It will be understood that any other suitable source of energy may be employed for producing the fusion in the plastic material.

I desire to so mount the carriage 24 upon the fixed base 22 as to enable the carriage to be moved laterally with respect to the mandrel 10. In the illustration given, the member 23 receives a rod 28 provided with a threaded end 29 engaging a threaded flange 30 of the member 22. A handle 31 is provided for rotating the rod 28 and thereby moving the carriage 24 laterally with respect to the mandrel 10.

The completed tube may be drawn manually along the mandrel but preferably is drawn by the means of power-driven resiliently tired wheels, as shown more clearly in my co-pending application, Serial No. 651,642 for Tube Forming Apparatus and Method.

In the specific illustration given, there is supported just ahead of the member 22 a bracket support for the ring or tube forming member. In this structure a screw 32 extends through a collar 33a and into the plate 15, as shown best in Fig. 2. Above the collar 33a is clamped a support arm 33 and the same extends forwardly, terminating in a ring 34. The ring 34 is adapted to receive an insert ring 35 having a bevelled rear face 36 adapted to receive the plastic strip 18 and fold it into a complete circle with the edges thereof overlapping. The insert 35 may be of any desired dimensions for receiving the particular stock of plastic material being treated. It will be understood that a variety of inserts 35 may be employed so as to permit the accurate handling of different sizes of plastic stock 18. The inserts may be thicker or thinner and may have different degrees of curvature as to its forward bevelled edges 36 so as to effectively handle different types of material. A simple friction pin 37 may be employed to lock the insert 35 in position, or, if desired, any other desired locking means may be employed. As shown more clearly in Fig. 6, the pin 37 may engage a recess in the insert member 35. Further, the mandrel tube 12 may be provided with an upwardly extending fin 38 adapted to be received within a corresponding slot in the member 35 to lock the same against rotation.

Operation

In the operation of the device, a plastic strip of material 18 is fed from any suitable source with the forward end of the material extending under the spring fingers of the guide member 17 and with the upper edges of the material received within the upper wings of the member 17. Since the support 11 for the mandrel extends in the space between the wings of the member 17, the web 18 does not contact this support 11. Similarly, the web does not interfere with the slot plate 19 and its support upon the mandrel 10 because the edges of the web 18 are received within the slots 20 and are still spaced apart. Thus, the web 18 will also clear the support 22 upon the mandrel and for the carriage 24. The web is still spaced far enough apart to clear the slender collar 33a and the supporting post 32 therefor. Beyond the post 32, however, the web 18 brings its edges more completely together and is guided between insert 35 with its bevelled edge 36 into definitely overlapping position. The overlapped edges of the tube lie just below the electronic foot 25, as shown more clearly in Fig. 7. Here the overlapping edges are subjected to the action of high frequency radio waves which tend to fuse together such overlapping tube portions. The electronic foot 25 is connected through line 27 to a radio frequency generator (not shown) and the dielectric character of the web is responsive to the high frequency radio waves in bringing about the fusion described.

A relatively wide range of frequencies may be employed in bringing about the fusion operation, depending upon the type of material being united, its thickness, power factor, and dielectric strength, etc. I have used frequencies of 200 megacycles effectively in the uniting of cellulose acetate, vinyl acetate, vinyl chloride (co-polymer). The effect of the high frequency radio waves is to bring about an internal change in the web so that a fusion occurs between the overlapping or adjacent walls, thus forming an integral seam for merging of the walls.

Instead of having the tube walls overlapping, as described, it will be understood that the edges of the tube may be brought into parallel relation and the electronic foot may be employed for bringing about the fusion transversely through the parallel edges of the tube.

The present structure has been found to be particularly effective by having the support for the electronic foot carried by the mandrel itself. Thus, the mandrel serves as the only means for connecting the electronic foot supporting structure with the frame or ground.

By having the carriage 24 mounted for lateral movement upon the mandrel, I can produce new and highly desirable effects through the lateral movement of the electronic foot. This may be done as an adjustment or it may be accomplished simultaneously and concurrently with the feeding operation of the tube. Thus a seam may be produced which is not only continuous along the top of the tube but may be of zigzag or weaving contour.

While I have shown the various fold forming members in specific locations, as illustrated in Fig. 1, it will be understood that the locations of such folding devices will be varied widely and changed with respect to each other to suit the requirements of different types of stock. Certain types of webbing will require different folding treatment and will require different relative spacing of the various folding members and electronic foot.

While in the foregoing specification I have set forth one specific form of structure for the purpose of illustrating the invention, it will be understood that such structure may be modified widely without departing from the spirit of my invention.

I claim:

1. In an apparatus for forming tubes from plastic sheet stock, comprising a mandrel, tube-forming means, and radio-frequency sealing means, the improvement comprising a first guide member having inwardly extending arcuate slots adapted to receive the edges of a plastic sheet, and a second guide member comprising a tubular element surrounding the mandrel and having an inwardly tapering inner surface, the supports to the mandrel of both of said guide means being limited to a single straight line on the mandrel surface parallel to the axis thereof, 2. Apparatus according to claim 1 having also a third support mountable to the mandrel and having a forward portion extending longitudinally along said mandrel ahead of said second guide means and carrying thereon an electrode for applying a radio-frequency field through the overlapped edges of the plastic tube formed by the guide means, the mandrel anchorage of said third support being also limited to said straight line on the mandrel surface and parallel to its axis.

FRED V. COLLINS.

REFERENCES CITED

The following references are of record in the file of this patent:

UNITED STATES PATENTS

| Number | Name | Date |
| --- | --- | --- |
| 648,930 | Doughty | May 8, 1900 |
| 1,810,585 | Young | June 16, 1931 |
| 1,917,210 | Adams | July 4, 1933 |
| 2,458,059 | Christensen | Jan. 4, 1949 |

OTHER REFERENCES

"An Electronic Sewing Machine," by Cyril Hoyler in "Electronics" of August 1943, pages 90–93, 160, 162, 164, 166 and 168.